United States Patent [19]
Peltz et al.

[11] 3,952,691
[45] Apr. 27, 1976

[54] FLUID PRESSURE SENSOR DEVICE

[75] Inventors: John Robert Peltz; Nikolaus A. Szeverenyi, both of Warren, Pa.

[73] Assignee: GTE Sylvania Incorporated, Stamford, Conn.

[22] Filed: Jan. 6, 1975

[21] Appl. No.: 538,546

[52] U.S. Cl............................ 116/65; 116/114 PV; 116/117 R; 137/557
[51] Int. Cl.²..................... G08B 1/04; F16K 37/00
[58] Field of Search... 116/114 PV, 117 R, 114 AD, 116/DIG. 42, DIG. 25, 70, 112, 65; 210/90; 137/557; 222/23; 73/419

[56] References Cited
UNITED STATES PATENTS

| | | | |
|---|---|---|---|
| 2,263,840 | 11/1941 | Franck | 116/117 R |
| 2,657,563 | 11/1953 | Burchett | 137/557 |
| 3,799,107 | 3/1974 | Sumner | 137/557 |

*Primary Examiner*—Richard C. Queisser
*Assistant Examiner*—Daniel M. Yasich
*Attorney, Agent, or Firm*—Norman J. O'Malley; Lawrence R. Fraley; Donald R. Castle

[57] ABSTRACT

There is disclosed a sensor device for providing an indication when the fluid pressure within a container or similar body exceeds an established level. The device comprises a housing suitable for being positioned within a wall of the container, a responsive means responsive to the fluid pressure within the container for being dislodged when said established level is exceeded, and an actuation means movably positioned within a chamber of the aforementioned housing for being moved when said established level is exceeded.

4 Claims, 5 Drawing Figures

FLUID PRESSURE SENSOR DEVICE

BACKGROUND OF THE INVENTION

This invention relates to sensor devices and more particularly to sensor devices for sensing fluid pressure.

More particularly, this invention relates to fluid pressure sensor devices capable of providing an indication when the fluid pressure within a container exceeds an established level.

Sensor devices having the ability to provide the above described capabilities are well known in the art. Particularly well known are those for detecting and indicating pressure differentials in closed systems. To date, a large majority of this variety of sensing devices have required either a spring-biased or magnetically actuated motion, or most likely a combination of the two. Two examples of such devices are illustrated in U.S. Pat. Nos. 3,499,415 and 3,502,048. In these and similar devices, usually the magnetic or spring forces are overcome during a gain or loss in pressure, the result being either an indication or a corrective measure undertaken. Still another example of this type of sensor is illustrated in U.S. Pat. No. 3,364,897. This sensor requires a pair of spring members in addition to a pair of magnetic devices positioned respectively within each spring.

As can be appreciated, sensors of the above described variety possess at least two distinctive operating deficiencies. Those utilizing magnets or similar members are capable of efficient operation only as long as these members maintain their magnetic properties. Thus, after prolonged periods of operation, these sensors have proven unsatisfactory. Sensors employing springs to bias moving components are usually operable only within definitely limited temperature ranges due to the effect of extremely high or low temperatures on the expansion properties of the spring. Furthermore, as in U.S. Pat. Nos. 3,364,897 and 3,499,415, the springs are exposed to the fluids being measured, thus providing an opportunity for contaminate or similar adverse buildup on these members if required to detect fluids having such undesirable properties.

It is believed, therefore, that a sensor device capable of providing an indication of excessive fluid pressure in a container without requiring utilization of magnetic or spring-biased motion will constitute an advancement in the art.

OBJECTS AND SUMMARY OF THE INVENTION

It is, therefore, a primary object of this invention to provide a sensor device for sensing when the fluid pressure within a container exceeds a pre-established level.

It is a further object of this invention to provide a sensor device of the variety described which is capable of providing an indication that said excessive pressure condition exists.

It is an even further object of this invention to provide the above mentioned features without requiring utilization of spring-biased or magnetic type motion by its internal components.

In accordance with one aspect of this invention, there is provided a sensor device for providing an indication when the fluid pressure in a container exceeds a pre-established level. The device, exclusive of any spring or magnetic components, comprises a housing member defining a chamber, a responsive means responsive to the fluid pressure within the container, and an actuation means movably positioned within a chamber of said housing. When the fluid pressure exceeds the established level, the described responsive means becomes dislodged and the actuation means moves to provide the desired condition.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
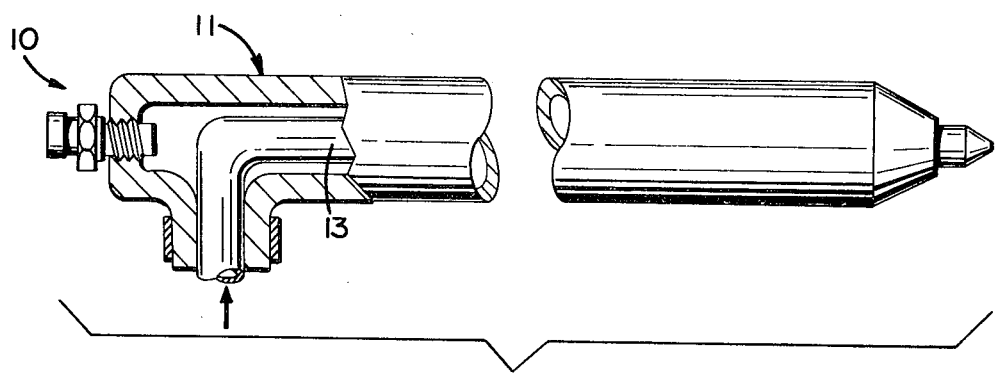
FIG. 1 is a side elevational view, partly in section, of one embodiment of the present invention as utilized in a fuel feed system.

With particular reference to FIG. 1 there is illustrated a sensor device 10 in accordance with one embodiment of the present invention. Sensor device 10 is illustrated as being positioned within a wall of a container 11 which in turn is positioned about a centrally located piping member 13. The arrangement as illustrated is typical of fuel feed systems found in most aviation engine systems. These systems comprise a plurality of separate feed assemblies which in turn consist of several containers having a plurality of piping members positioned therein. As can be appreciated, a particularly hazardous condition exists in the system when the centrally located fuel feed piping member 13 becomes broken or similarly ruptured. It is for this purpose that the secondary container 11 is provided to assure a means whereby highly volatile fuel will not be permitted to spill into the engine compartment should such a rupture occur.

As described, most aviation engines of today utilize a plurality of individual feeding systems as illustrated in FIG. 1 to supply fuel to an ignition source. To maintain each of these systems in operation and thus assure that rupture to the fuel feed pipes did not occur, a mechanic was required to systematically remove a retention plug or similar member from each of the several individual containers in the system. This was usually the practice during overhaul or a related periodic inspection of the aircraft engine. As can be appreciated, such a procedure was indeed time consuming and expensive in terms of man hours required. The mechanic was required to remove each of said plugs and inspect the container 11 for any leakage of fuel. Such a procedure also presented a somewhat hazardous situation to the individual making such an inspection.

Thus there has been a long felt need in the aviation industry as well as in other industries utilizing similar systems for a more simplified method of indicating when fluid pressures have exceeded pre-established levels. In the particular case of the aviation industry, the need is simply for a provided indication should a rupture occur in one of the several feed pipes which supply the aircraft engines.

While the sensor device as described is illustrated as being utilized in a system substantially similar to that used in aviation fuel feed systems, it is understood that the sensor to be described can easily be adaptable to any substantially closed system wherein it is desired to readily indicate a rise in fluid pressure within said system.

Figure 2:
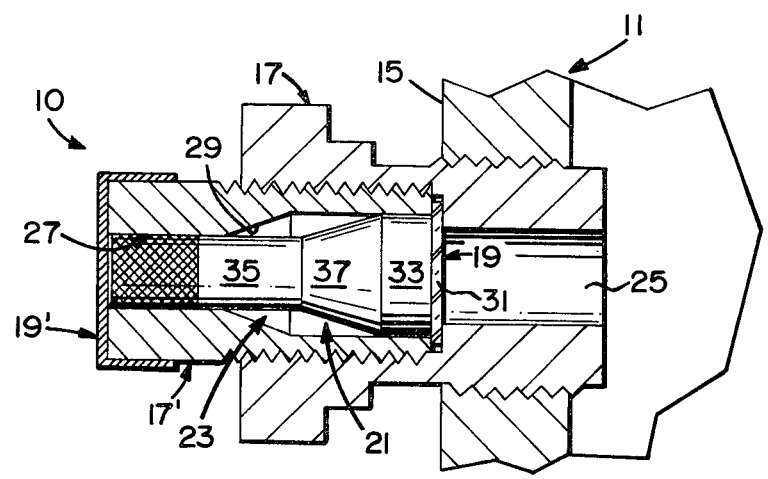
FIG. 2 is an enlarged sectional view of the sensor of FIG. 1.

Referring with particularity to FIG. 2, sensor 10 is illustrated as being positioned within a wall 15 of container 11. Sensor 10 is illustrated as comprising a housing member 17, a responsive means 19, and an actuation means 21. Housing 17, positioned within wall 15 of container 11, defines a chamber 23 therein. Chamber 23 has at least a first portion 25 which is in direct communication with the fluid pressure within container 11. That is, when the fluid pressure within container 11 rises, the fluid will enter first portion 25 of chamber 23. Chamber 23 is also illustrated in FIG. 2 as comprising a second portion 27 which in turn is in communication with the environment externally of container 11. Positioned substantially between first portion 25 and second portion 27 of chamber 23 is a substantially tapered wall portion 29. As will be understood, wall portion 29 and second portion 27 provide only secondary capabilities to the present invention as defined and are therefore not considered essential to the broad concept of the invention. As will be further understood, it is only essential that chamber 23 be in communication with the fluid within container 11, in this particular instance through first portion 25.

Responsive means 19, preferably in the form of a frangible disc member 31, is preferably positioned relative to actuation means 21 as well as first portion 25 of chamber 23. In the embodiment as illustrated in FIG. 2, disc member 31 is positioned between actuation means 21 and first portion 25 to thus provide the additional feature of assuring a seal between said member and end portion. Responsive means 19 however provides the primary function of being adapted for being dislodged only when the fluid pressure within container 11 exceeds a pre-established level. In the particular embodiment as illustrated, this pressure level is reached when fluid enters first portion 25 of sensor 10. Frangible member 31 is thereafter adapted for becoming deformed or dislodged in a direction away from first portion 25 of chamber 23 to turn force actuation means 21 in a similar direction.

Actuation means 21 is shown in FIG. 2 as comprising a movable piston member adapted for moving within chamber 23 of housing 17 only when the fluid pressure within container 11 exceeds the established level. As will be described, piston 21 is further adapted for providing an indication upon said movement. Piston 21 is illustrated as comprising first and second opposing end portions 33 and 35 respectively. Positioned substantially between opposing ends 33 and 35 is a substantially centrally located tapered portion 37, said portion adapted for mating with tapered wall section 29 of chamber 23 to provide a seal between first and second portions 25 and 27, respectively, of chamber 23. As further illustrated in FIG. 2, second opposing end 35 of piston 21 is adapted for slidable movement within second portion 27 of chamber 23. This movement in turn provides a means whereby opposing end 35 may extend from housing 17 of sensor 10 when piston 21 has completed its movement.

In the embodiment of FIG. 2, a second responsive means 19' is illustrated and comprises a cap member positioned substantially about an end of housing 17 external from container 11. Cap member 19' serves to prevent the accumulation of dust or other contaminants within chamber 23 during operation of the fuel feed system. As can be appreciated, cap member 19' could serve to provide the sole responsive means of the present invention should the measured pressure level be substantially low. That is, frangible disc 31 could easily be removed with cap member 19' being the only restrictive means utilized. As can be understood, however, in most fuel feed systems for aviation engine, a rupture in the central fuel pipe (13 in FIG. 1) would in turn result in a substantially high pressure against sensor 10. Thus when sensor 10 is used in the manner as indicated, it is preferred to retain frangible member 31.

To provide a means whereby repair to sensor 10 can easily be provided, housing 17 is illustrated as comprising a secondary portion 17'. Portion 17' is adapted for being retained within main portion 17 of the housing through screw threads as illustrated. Accordingly, when sensor 10 has been activated and it is desired to return the sensor to its normal condition, secondary portion 17' is removed. This in turn provides a means whereby frangible disc 31 can easily be replaced.

Figure 3:
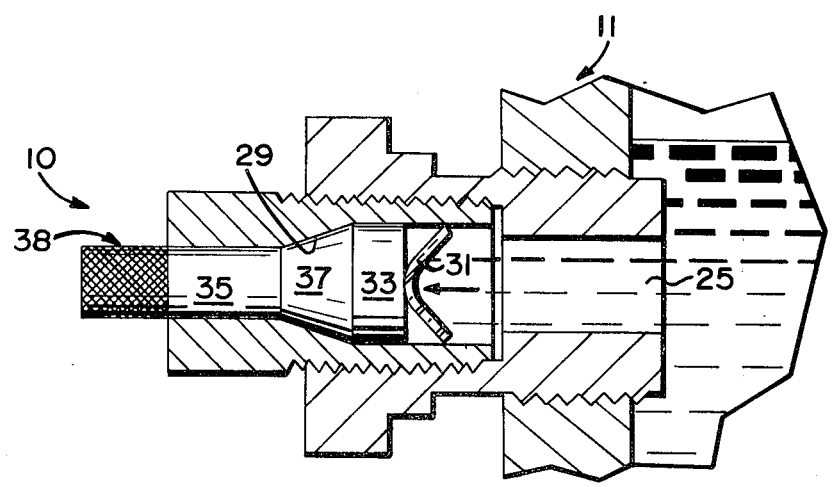
FIG. 3 is a sectional view of the sensor of FIG. 2 when actuated.

With particular reference to FIG. 3, sensor 10 is illustrated as being actuated upon the presence of fluid within first portion 25 of chamber 23. As has been described, such a fluid pressure rise results in the displacement of piston 21 in the direction as indicated. This movement in turn results in the removal of cap member 19' and the resulting extension of end portion 35 from the housing 17. Frangible member 31, as illustrated, has become dislodged and additionally deformed or broken in the manner indicated.

Thus a means has been provided whereby a mechanic or similar operator may readily ascertain when a pressure rise has occured within container 11. An indication in the form of a protruding member (35) provides a dual means whereby both a visual and a touch indication is assured. Should the conditions within the aircraft's engine compartment be nonconducive to visual inspection, the mechanic can simply probe each of the sensor members to ascertain which has been triggered. When conditions permit a more lightened environment, the mechanic has only to visually analyze each of the sensors. Thus repair to the specific rupture fuel line can be readily accomplished. As can further be seen in FIG. 3, sensor 10 provides the additional capability of assuring a seal to prevent any loss of fluid from container 11.

To assure a means whereby a visual inspection of each sensor is facilitated, it is preferred to provide each of the opposing ends 35 of piston 21 with a readily discernible material 38 such as a reflective paint.

Figure 4:
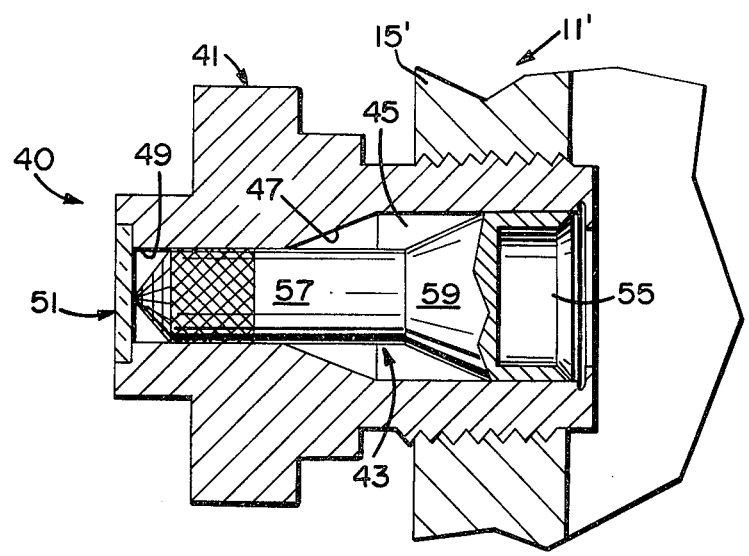
FIG. 4 is a sectional view of an alternate embodiment of the present invention.

With particular reference to FIG. 4, there is illustrated a sensor device 40 in accordance with an alternate embodiment of the present invention. Sensor 40 comprises a housing 41 adapted for being positioned within a wall 15' of a container 11' in much the same manner as that of sensor 10 in FIG. 2. Housing 41 defines a chamber 43 therein, said chamber having a first portion 45 in communication with fluid pressure within container 11', a substantially centrally located tapered portion 47, and a second portion 49 adapted for being in communication with the environment external of container 11'.

Sensor 40 further comprises a responsive means 51 positioned as indicated within housing 41. Responsive means 51 is preferably in the form of a frangible disc member similar to disc member 31 in sensor 10.

Sensor 40 further comprises an actuation means 53 in the form of a movable piston similar to piston 21 in sensor 10. Piston 53 comprises a first opposing end 55, a second opposing end 57, and a substantially centrally located tapered portion 59. As illustrated, first opposing end 55 of piston 53 is adapted for slidably moving within first portion 45 of chamber 43. Additionally, second opposing end 57 is adapted for slidably moving within second portion 49 of chamber 43. Similar to the movements of piston 21 in FIG. 2, tapered portion 59 of piston 53 is adapted for mating with tapered wall section 47 of chamber 43 to provide a seal whereby fluid loss from within container 11' is prevented during actuation of sensor 40.

Figure 5:
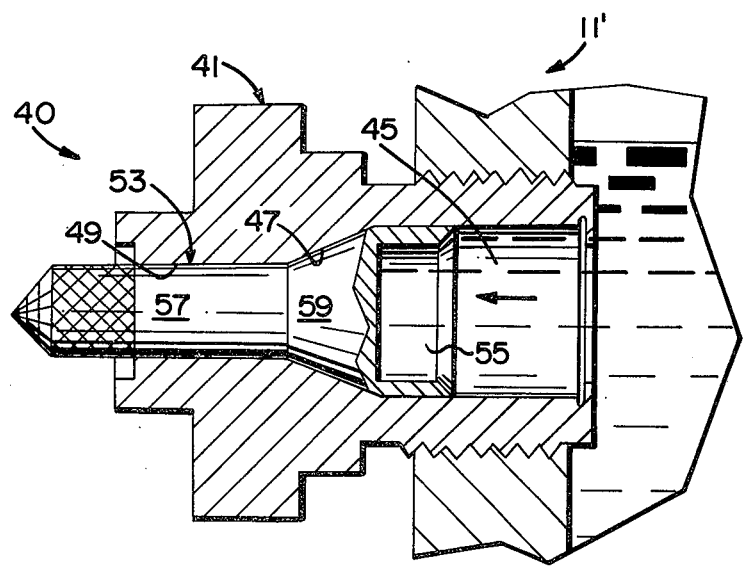
FIG. 5 is a sectional view of the sensor of FIG. 4 when actuated.

As indicated in FIG. 5, when the fluid pressure about first opposing end 55 of piston 43 exceeds a predetermined level, the piston is driven in the direction indicated to dislodge responsive means 51 from its relatively secured position. In turn, opposing end 57 of the piston member is now extended from beyond housing 41. This in turn provides a visual or touch indication to a mechanic in a similar manner to that provided for sensor 10 in FIG. 2. As further illustrated in FIG. 4, it is preferred to taper end 57 of piston 53 to facilitate dislodgement of member 51.

The embodiment as illustrated in FIGS. 3 and 4 is preferably of the throw-away variety although it is understood that sensor 40 could easily be repaired by a mechanic returning piston 53 to its original unactuated position and replacing frangible member 51.

In the embodiment of the invention as illustrated in FIGS. 2–4 it is preferred to utilize stainless steel, aircraft aluminum, or a similar corrosion resistant metal for the material for housings 17, 17', and 41. It is additionally preferred to utilize stainless steel, aircraft aluminum, or a similar corrosion resistant metal, or plastic (for lower pressure and lower temperature applications) as the material for pistons 21 and 53. The described frangible disc members are preferably of brass, aluminum, or stainless steel material.

Thus there has been shown and described a sensor device for providing an indication when the fluid pressure within a container exceeds a predetermined level. As can be appreciated, the device as described and illustrated is readily adaptable to several systems and is not limited to that as shown. For example, the sensor of the present invention could easily be incorporated in systems utilizing hydraulic or similar flow, as typically found in industrial processes. The present invention as described is relatively simple in operation as well as inexpensive to manufacture and in turn provides a relatively high degree of reliability during operation.

While there has been shown and described what are at present considered the preferred embodiments of the invention, it will be obvious to those skilled in the art that various changes and modifications may be made therein without departing from the scope of the invention as defined by the appended claims.

What is claimed is:

1. A sensor device for providing an indication when the fluid pressure within a container exceeds a pre-established level, said sensor device comprising:
   a housing member adapted for being positioned within a wall of said container, said housing member defining a chamber having a first portion in communication with said fluid pressure within said container, a second portion in communication with the environment substantially about said container, and a tapered wall portion positioned between said first and second portions;
   responsive means secured to said housing relative to said second portion of said chamber for being dislodged only when said fluid pressure within said container exceeds said pre-established level; a piston actuation member sealingly and retainedly located between oppositely disposed ends of the first and second portions of said chamber for moving within said chamber of said housing member and providing an indication only when said fluid pressure exceeds said preestablished level, said piston actuation member having first and second opposing end portions and a centrally located tapered portion, said second opposing end portion dislodging said responsive means and thereafter extending from said housing to provide said indication when said piston actuation member moves within said chamber, said tapered portion mating with said tapered wall portion of said chamber to provide a seal between said first and second portions of said chamber upon completion of said movement of said piston actuation member within said chamber.

2. The sensor device according to claim 1 wherein said responsive means comprises a restrictive cap member positioned substantially about said housing and relative to said second opposing end portion of said piston actuation member within said chamber of said housing.

3. The sensor device according to claim 2 further including a frangible responsive member positioned relative to said first opposing end portion of said piston actuation member for being deformed only when said fluid pressure exceeds said pre-established level.

4. The sensor device according to claim 1 wherein said responsive means comprises a frangible disc member positioned relative to said second opposing end portion of said piston actuation member for being dislodged by said second opposing end of said piston member only when said fluid pressure exceeds said pre-established level.

* * * * *